United States Patent
Chu et al.

(10) Patent No.: US 7,940,596 B2
(45) Date of Patent: May 10, 2011

(54) ADAPTIVE ZERO CURRENT SENSE APPARATUS AND METHOD FOR A SWITCHING REGULATOR

(75) Inventors: Kwan-Jen Chu, Hsinchu (TW); Nien-Hui Kung, Hsinchu (TW); Tzu-Huan Chiu, Jhubei (TW); Chien-Ping Lu, Jhubei (TW)

(73) Assignee: Richtek Technology Corp., Hsinchu (TW)

( * ) Notice: Subject to any disclaimer, the term of this patent is extended or adjusted under 35 U.S.C. 154(b) by 11 days.

(21) Appl. No.: 12/588,946

(22) Filed: Nov. 3, 2009

(65) Prior Publication Data

US 2010/0052629 A1 Mar. 4, 2010

Related U.S. Application Data

(62) Division of application No. 12/078,356, filed on Mar. 31, 2008, now Pat. No. 7,652,945.

(30) Foreign Application Priority Data

Apr. 4, 2007 (TW) .............................. 96112074 A

(51) Int. Cl.
*G11C 5/14* (2006.01)
(52) U.S. Cl. ........ 365/226; 323/271; 323/282; 323/284; 323/285

(58) Field of Classification Search ................... 365/226
See application file for complete search history.

(56) References Cited

U.S. PATENT DOCUMENTS

| | | | |
|---|---|---|---|
| 6,606,259 B2 * | 8/2003 | Cohen | 363/56.01 |
| 6,728,117 B2 * | 4/2004 | Schemmann et al. | 363/21.12 |
| 6,894,461 B1 * | 5/2005 | Hack et al. | 323/205 |
| 7,030,570 B2 * | 4/2006 | Alexandrov | 315/224 |
| 7,330,019 B1 * | 2/2008 | Bennett et al. | 323/282 |
| 7,652,945 B2 * | 1/2010 | Chu et al. | 365/226 |
| 7,706,151 B2 * | 4/2010 | Neidorff et al. | 363/9 |
| 2010/0308784 A1 * | 12/2010 | Scoones et al. | 323/282 |

* cited by examiner

*Primary Examiner* — Viet Q Nguyen
(74) *Attorney, Agent, or Firm* — Rosenberg, Klein & Lee

(57) ABSTRACT

A switching regulator includes a low-side switch having a body diode. During the low-side switch is on, a zero-current sense circuit monitors the inductor current of the switching regulator and triggers a signal to turn off the low-side switch when the inductor current falls down to a zero-current threshold, to prevent reverse inductor current from the output terminal of the switching regulator. A body-diode turn-on time controller monitors the turn-on time of the body diode and adjusts the zero-current threshold according thereto, and the turn-on time of the body diode can be reduced to an optimal interval subsequently. The self-adjustable zero-current threshold is adaptive according to the application conditions, such as the inductor size, input voltage and output voltage of the switching regulator.

5 Claims, 10 Drawing Sheets

US 7,940,596 B2

ADAPTIVE ZERO CURRENT SENSE APPARATUS AND METHOD FOR A SWITCHING REGULATOR

RELATED APPLICATIONS

This application is a Divisional patent application of application Ser. No. 12/078,356, filed on 31 Mar. 2008 now U.S. Pat. No. 7,652,945. The entire disclosure of the prior application Ser. No. 12/078,356, from which an oath or declaration is supplied, is considered a part of the disclosure of the accompanying Divisional application and is hereby incorporated by reference.

FIELD OF THE INVENTION

The present invention is related generally to a switching regulator and, more particularly, to a zero-current sense apparatus and method for a switching regulator.

BACKGROUND OF THE INVENTION

According to the inductor current condition, the operation of switching regulators can be generally categorized into two types: Continuous Conduction Mode (CCM) and Discontinuous Conduction Mode (DCM). FIGS. 1 and 2 are waveform diagrams of the ideal inductor currents in CCM and DCM switching regulators, respectively, and both the modes have respective advantages and applications. FIG. 3 shows a conventional DCM synchronous buck switching regulator 100, in which a controller 101 switches a high-side switch 110 and a low-side switch 112 connected in series between a power input terminal Vin and a ground terminal GND to generate an inductor current IL that charges a capacitor Co to produce an output voltage Vout, and voltage divider resistors R1 and R2 are connected in series between the output terminal Vout and the ground terminal GND to generate a feedback voltage VFB for the controller 101 to regulate the output voltage Vout. In the controller 101, an error amplifier and compensator unit 102 generates an error signal VEA according to the feedback voltage VFB, a Pulse Width Modulation (PWM) comparator 104 generates a PWM signal according to the error signal VEA, a logic and driver unit 106 switches the switches 110 and 112 in response to the PWM signal to convert the input voltage Vin to the output voltage Vout, and a zero-current sense circuit 108 senses the inductor current IL by sensing the voltage on the phase node LX, and triggers a zero-current detection signal ZCDET for the logic and driver unit 106 to turn off the switch 112 when the inductor current IL falls down to a zero-current threshold Ith during the switch 112 is on, in order to prevent reverse inductor current IL from the output terminal Vout.

FIG. 4 is a waveform diagram showing the inductor current IL and the voltage on the phase node LX of the switching regulator 100, in which waveform 200 represents the inductor current IL, and waveform 202 represents the voltage on the phase node LX. At time t1, the high-side switch 110 is turned on and the low-side switch 112 is turned off, and thereby the inductor current IL begins to increase with the slope $$\text{slope\_rise}=(V\text{in}-V\text{out})/L. \quad [\text{Eq-1}]$$

At time t2, the high-side switch 110 is turned off and the low-side switch 112 is turned on, and thereby the inductor current IL begins to decrease with the slope $$\text{slope\_fall}=V\text{out}/L. \quad [\text{Eq-2}]$$

When the inductor current IL falls down to the zero-current threshold Ith, as shown at time t3, the low-side switch 112 is turned off to prevent reverse inductor current IL from the output terminal Vout. As shown by the waveform 202 in FIG. 4, between times t3 and t4, a body diode 114 of the switch 112 is turned on to remain the inductor current IL flowing from the ground terminal GND to the output terminal Vout through the phase node LX, and until the inductor current IL becomes zero the body diode 114 turns off.

However, the zero-current threshold Ith of the conventional zero-current sense circuit 108 is fixed but not adjustable when it is designed, and in the event that the output voltage Vout or the inductor L is changed, causing the falling slope slope_fall of the inductor current IL changed, the pre-set zero-current threshold Ith becomes not suitable to the real conditions. For example, when the falling slope slope_fall of the inductor current IL is changed to be much steeper as shown by the waveform 204 in FIG. 5, the low-side switch 112 may not be turned off in time after the inductor current IL falls down to the zero-current threshold Ith, the voltage on the phase node LX may become positive eventually, as shown by the waveform 206 in FIG. 5, and a reverse inductor current IL occurs. On the contrary, when the falling slope slope_fall of the inductor current IL is changed to be much gentler as shown by the waveform 208 in FIG. 6, the body diode 114 is eventually conductive for a longer time period after the inductor current IL falls down to the zero-current threshold Ith, as shown by the waveform 210 in FIG. 6, and more wasted power consumption occurs.

Therefore, it is desired a zero-current sense apparatus and method with an adjustable zero-current threshold for a switching regulator.

SUMMARY OF THE INVENTION

Accordingly, an object of the present invention is to provide a zero-current sense apparatus and method with an adjustable zero-current threshold for a switching regulator.

According to the present invention, a zero-current sense apparatus and method for a switching regulator monitor the inductor current of the switching regulator, to trigger a first signal when the inductor current falls down to a zero-current threshold during the low-side switch is on, to turn off the low-side switch of the switching regulator, and monitor the body diode turn-on time of the low-side switch after the low-side switch is turned off in response to the first signal, to determine a second signal to remain or adjust the zero-current threshold. If the body diode turn-on time is detected within a given value, the zero-current threshold is locked at the current level, otherwise the zero-current threshold is reduced. With the adjustable zero-current threshold, the switching regulator may turn off the low-side switch before the voltage on the phase node goes high across a pre-set zero-point, and adjust the timing within a given time interval.

Preferably, the zero-current threshold is self-adjusted according to the slope of the inductor current, which is dependent on the input voltage, output voltage and inductor size of the switching regulator. Therefore, the proposed apparatus and method can be adaptive according to the application conditions.

Advantageously, the proposed apparatus and method can prevent reverse inductor current from the output terminal of a switching regulator, and also control the body-diode turn-on time of the low-side switch within a given value.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

Figure 1:
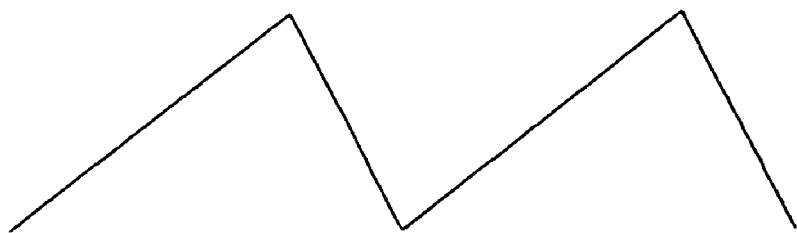
FIG. 1 is a waveform diagram of the ideal inductor current in CCM switching regulators.
Figure 2:
FIG. 2 is a waveform diagram of the ideal inductor current in DCM switching regulators.
Figure 3:
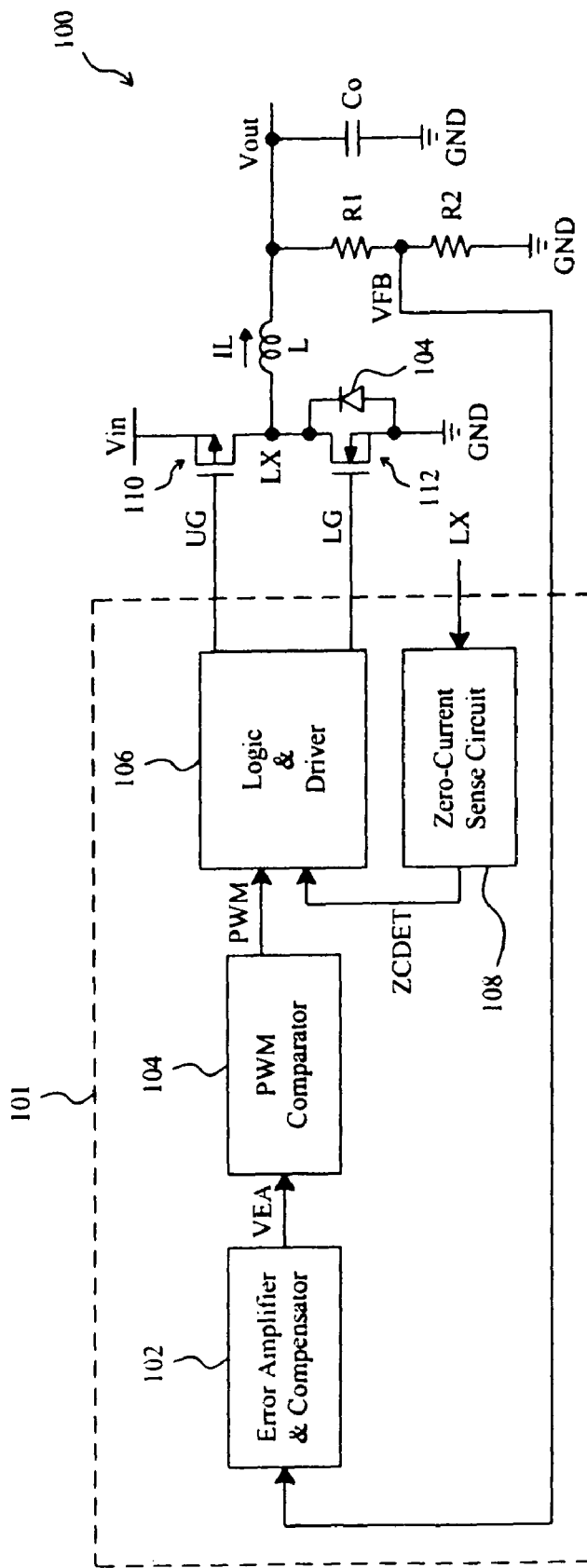
FIG. 3 shows a conventional DCM synchronous buck switching regulator.
Figure 4:
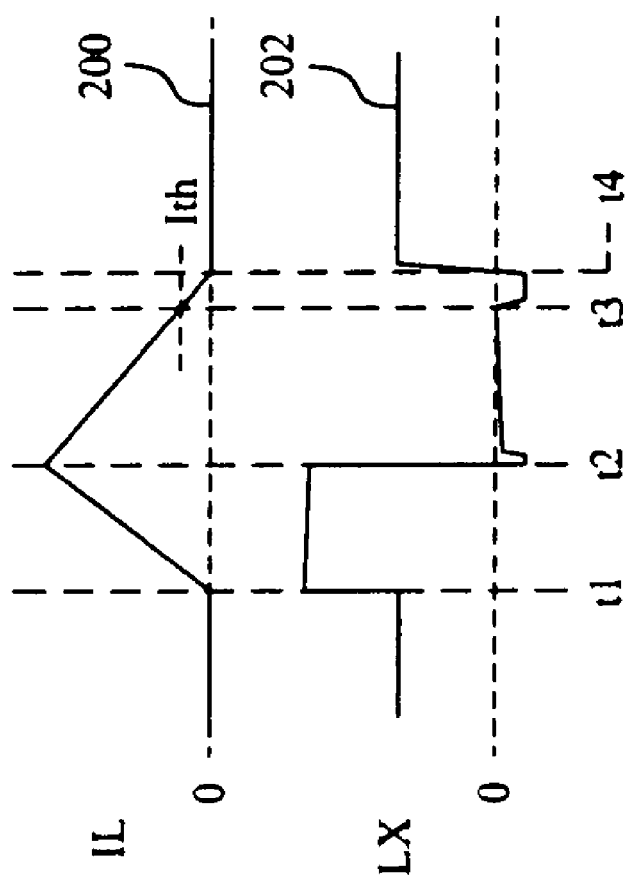
FIG. 4 is a waveform diagram showing the inductor current and the voltage on the phase node of the switching regulator of FIG. 3.
Figure 5:
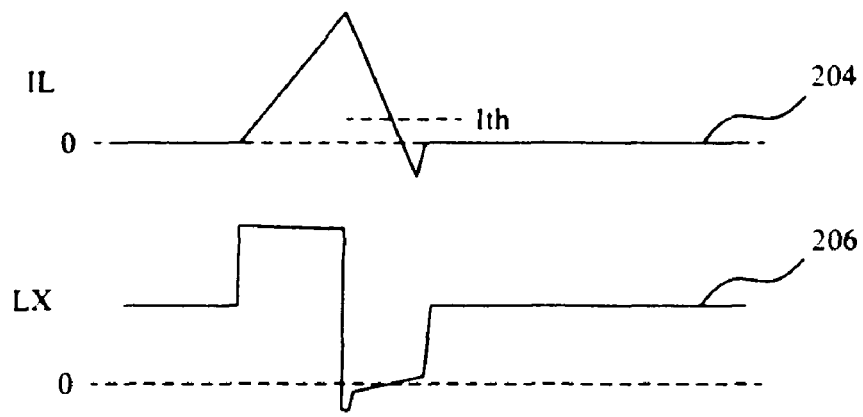
FIG. 5 is a waveform diagram showing the inductor current and the voltage on the phase node of the switching regulator of FIG. 3 when the inductor current has an excessively steep falling slope.
Figure 6:
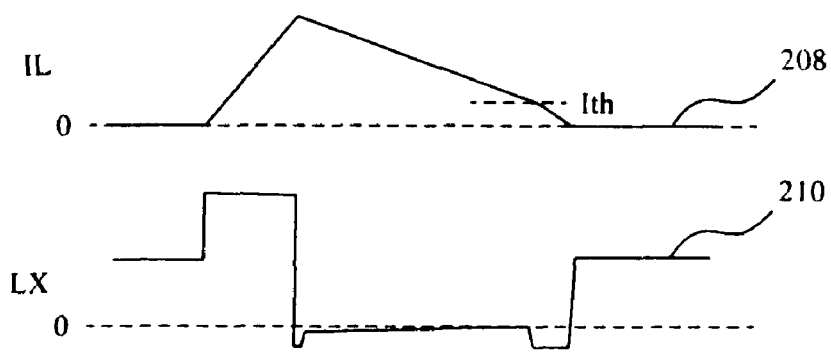
FIG. 6 is a waveform diagram showing the inductor current and the voltage on the phase node of the switching regulator of FIG. 3 when the inductor current has an excessively gentle falling slope.
Figure 7:
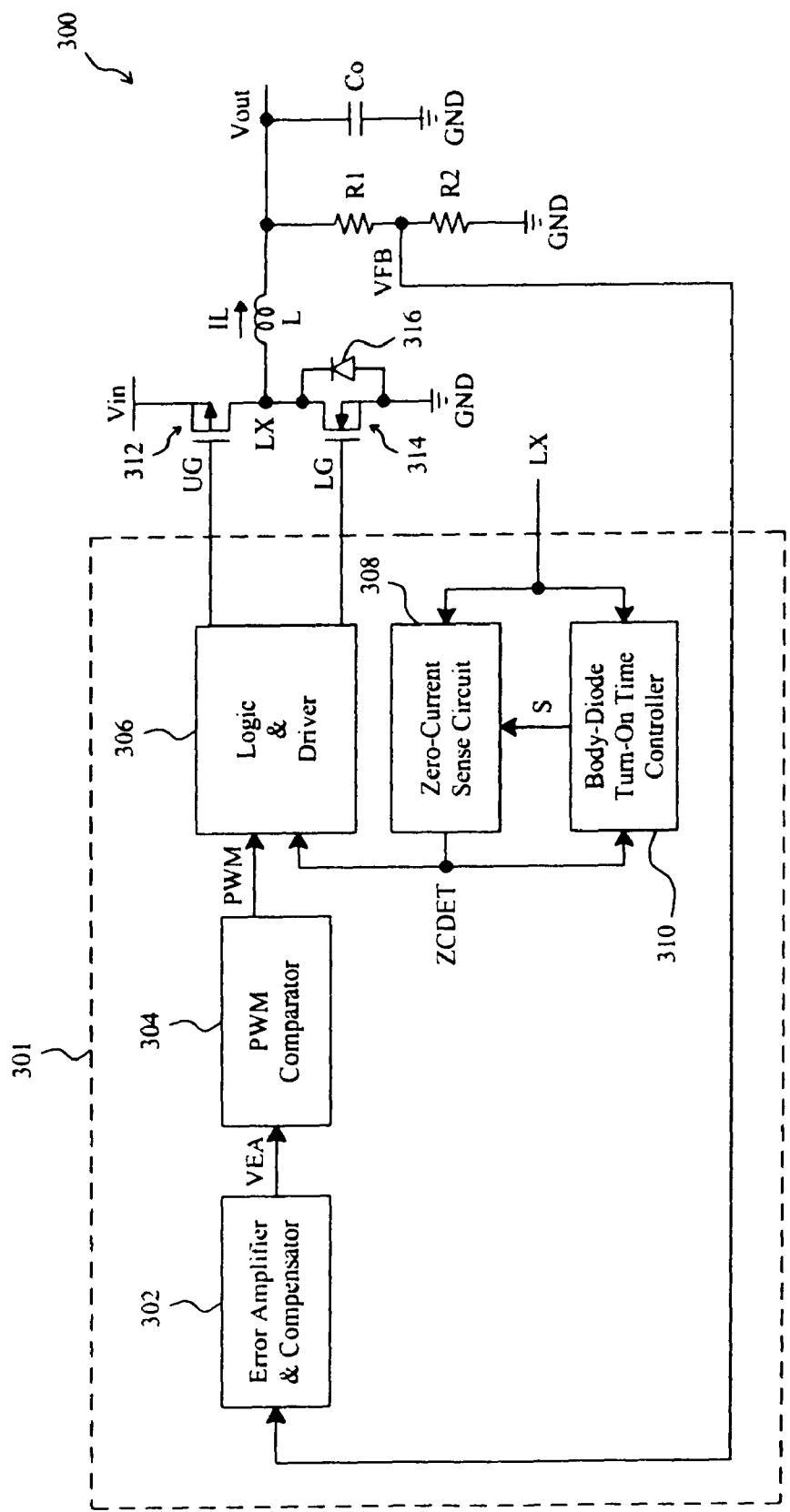
FIG. 7 shows an embodiment for zero-current sense apparatus for a switching regulator according to the present invention.

As shown in FIG. 7, in a switching regulator 300, a controller 301 switches a high-side switch 312 and a low-side switch 314 connected in series between a power input terminal Vin and a ground terminal GND, to generate an inductor current IL that charges a capacitor Co to produce an output voltage Vout, the low-side switch 314 has a body diode 316, and voltage divider resistors R1 and R2 are connected in series between the output terminal Vout and the ground terminal GND, to generate a feedback voltage VFB for the controller 301 to regulate the output voltage Vout. In the controller 301, an error amplifier and compensator unit 302 generates an error signal VEA according to the feedback voltage VFB, a PWM comparator 304 generates a PWM signal according to the error signal VEA to provide for a logic and driver unit 306 to drive the switches 312 and 314, a zero-current sense circuit 308 monitors the inductor current IL by monitoring the voltage on the phase node LX and triggers a zero-current detection signal ZCDET when the inductor current IL falls down to a zero-current threshold Ith during the switch 314 is on for the logic and driver unit 306, and a body-diode turn-on time controller 310 provides a signal S according to the voltage on the phase node LX and the zero-current detection signal ZCDET for the zero-current sense circuit 308, to remain or adjust the zero-current threshold Ith, thereby causing the turn-on time of the body diode 316 remained or adjusted. The zero-current threshold Ith, and thereby the turn-on time of the body diode 316, can be self-adjustable by the internal circuit of the controller 301 according to the slope of the inductor current IL, which is dependent on the input voltage Vin, output voltage Vout and inductor size of the switching regulator 300.

Figure 8:
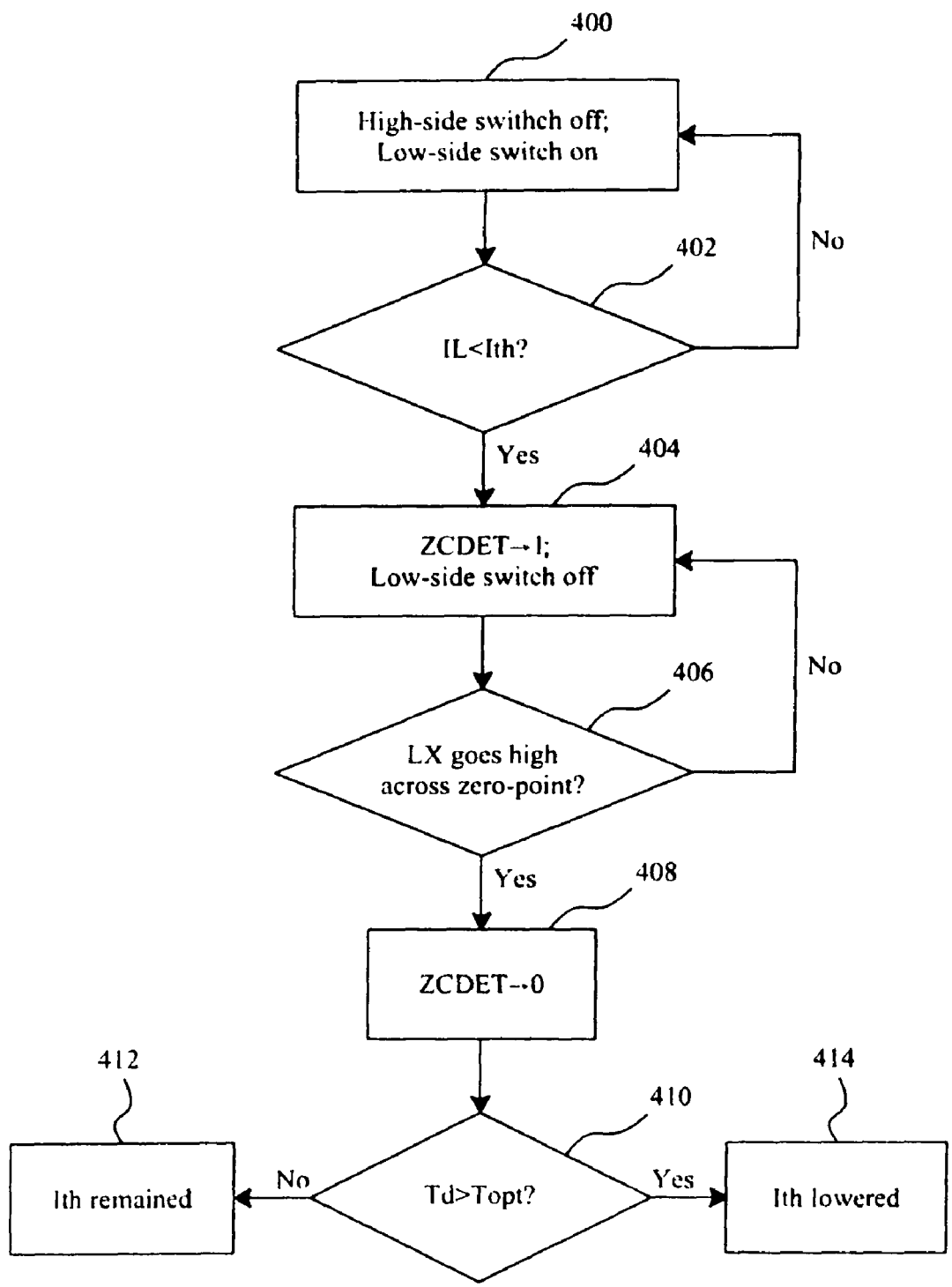
FIG. 8 is a flowchart of zero-current sense method for a switching regulator according to the present invention.
Figure 9:
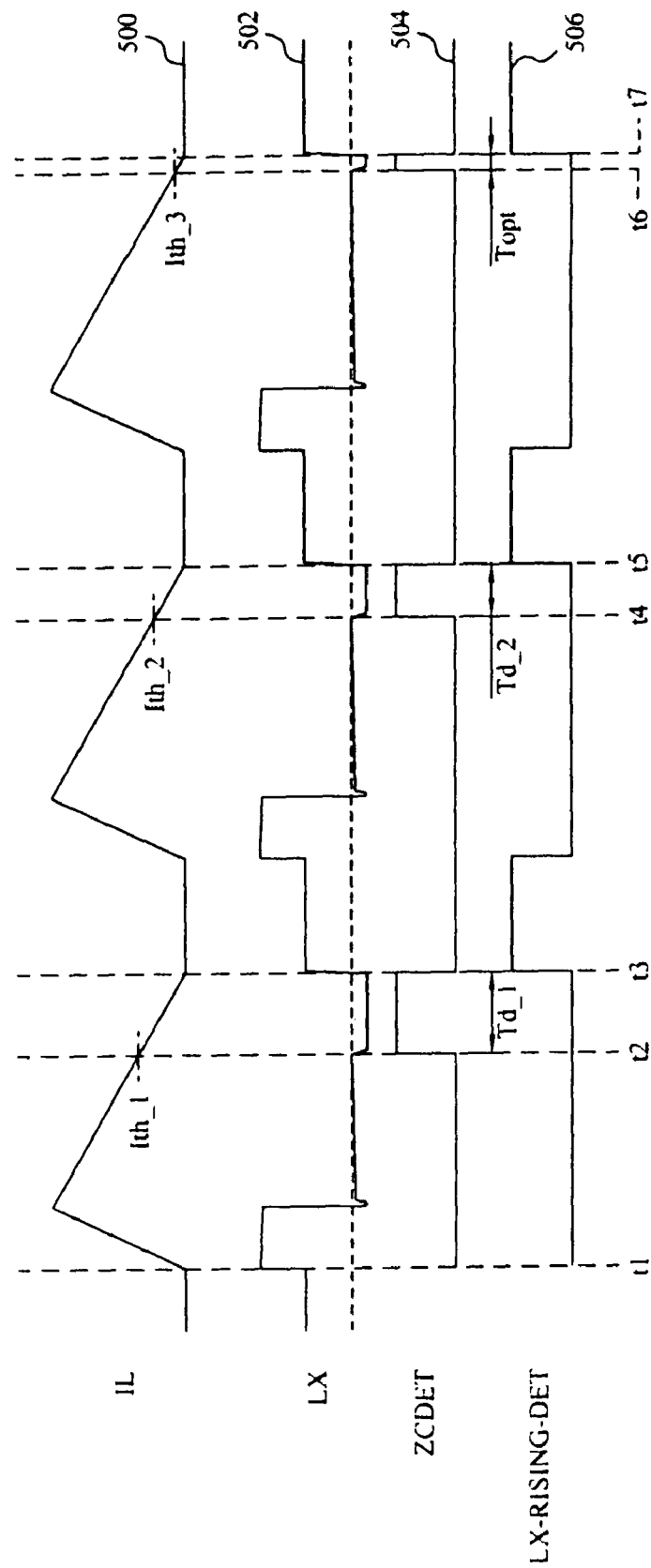
FIG. 9 is a waveform diagram showing the signals in the circuit of FIG. 7.

FIG. 8 is a flowchart of zero-current sense method according to the present invention for the switching regulator 300 of FIG. 7. FIG. 9 is a waveform diagram showing the signals in the switching regulator 300 of FIG. 7, in which waveform 500 represents the inductor current IL, waveform 502 represents the voltage on the phase node LX, waveform 504 represents the zero-current detection signal ZCDET, and waveform 506 represents a signal LX_RISING_DET which indicates the rising edge of the voltage on the phase node LX. With reference to FIGS. 7-9, in Step 400, the high-side switch 312 is turned off and the low-side switch 314 is turned on at time t1. Assuming that the initial zero-current threshold Ith of the zero-current sense circuit 308 is Ith_1, Step 402 will check whether or not the inductor current IL is smaller than the zero-current threshold Ith_1. If it is not the case, the process returns to the Step 400; otherwise, namely the inductor current IL is smaller than the zero-current threshold Ith_1, as shown at time t2, the process enters Step 404, in which the zero-current detection signal ZCDET transits to high to turn off the low-side switch 314 as shown by the waveform 504 in FIG. 9, and the body diode 316 turns on to remain the inductor current IL flowing in the current direction. Then, Step 406 monitors the voltage on the phase node LX and checks whether or not it is across a zero-point, which indicates the reference voltage and is 0V in this embodiment. This step may be performed by using a zero-point detector to detect the voltage on the phase node LX. If the voltage on the phase node LX is not greater than zero, the process returns to the Step 404. Contrarily, if the voltage on the phase node LX is greater than zero, the process proceeds to Step 408, in which the zero-current detection signal ZCDET transits to low as shown at time t3 in FIG. 9, and the body diode 316 is consequently turned off. Then in Step 410, the body-diode turn-on time controller 310 checks whether or not the turn-on time Td of the body diode 316, namely the time period that the zero-current detection signal ZCDET stays at high level, is longer than a pre-set value Topt. At this time the body-diode turn-on time is Td_1, as shown between times t2 and t3 in FIG. 9. If it is detected the current body-diode turn-on time Td_1 is longer than Topt, then Step 414 will decrease the zero-current threshold Ith from Ith_1 to Ith_2, and the Steps 400-410 will repeat with the new zero-current threshold Ith_2. Subsequently, the next turn-on time Td of the body diode 316 will be shorter, as shown by Td_2 between times t4 and t5 in FIG. 9. If in Step 410 the turn-on time Td of the body diode 316, i.e. Td_2 at this time, is still longer than Topt, the zero-current threshold Ith will be further reduced from Ith_2 to Ith_3, and then the Steps 400-410 repeat again with the new zero-current threshold Ith_3. Once the turn-on time Td of the body diode 316 eventually becomes equal to or shorter than Topt, such as that between times t6 and t7 in FIG. 9, Step 412 will lock the current zero-current threshold Ith, for example Ith_3 at this time. Through this process, the zero-current sense circuit 308 is self-calibrated by the body-diode turn-on time Td and the driver delay time. The parameter Topt is preferably an optimal body-diode turn-on time or a target for the turn-on time Td of the body diode 316, which may bring the switching regulator 300 into best efficiency operations, especially at light load condition.

Figure 10:
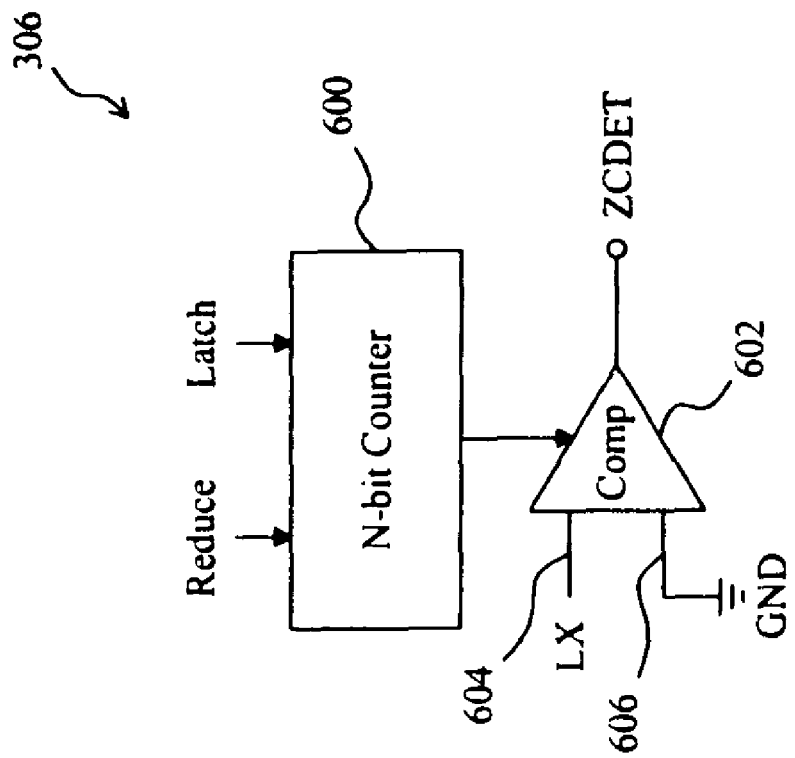
FIG. 10 is a first embodiment for the zero-current sense circuit in FIG. 7.
Figure 11:
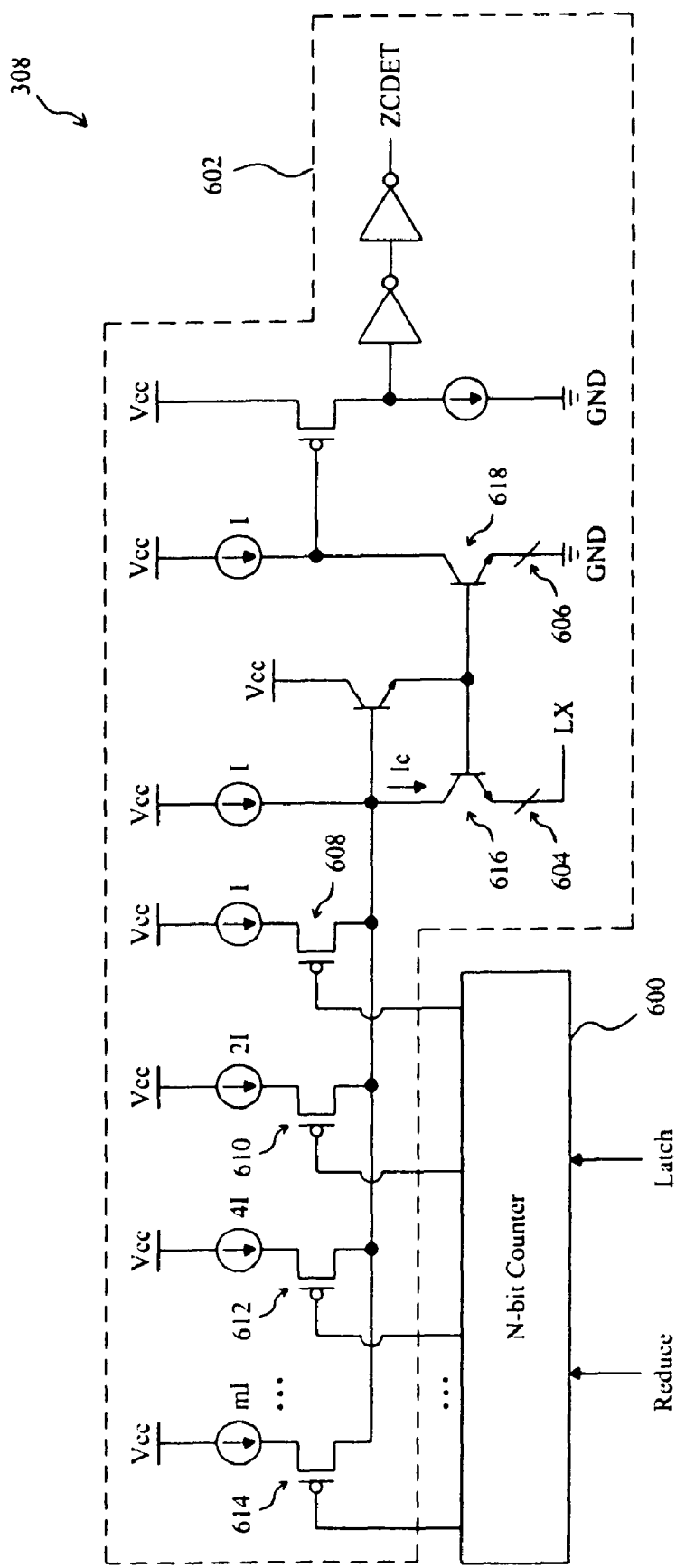
FIG. 11 is an embodiment for the comparator in FIG. 10.

FIG. 10 provides an embodiment for the zero-current sense circuit 308 of FIG. 7, in which a comparator 602 has two input terminals 604 and 606 connected to the phase node LX and the ground terminal GND, respectively, and an output terminal to trigger the zero-current detection signal ZCDET. When the inductor current IL flowing through the phase node LX during the low-side switch 314 is on falls down to become lower than the zero-current threshold Ith, the voltage on the phase node LX will go high across zero, and therefore the output ZCDET of the comparator 602 transits to high. The output ZCDET of the comparator 602 will not transit back to low unless the inductor current IL becomes zero. In this embodiment, the signal S from the body-diode turn-on time controller 310 includes signals Reduce and Latch, and an N-bit counter 600 will change or remain the setting of the comparator 602 according to the signals Reduce and Latch, so as to adjust or remain the zero-current threshold Ith. FIG. 11 is an embodiment for the comparator 602, in which a bipolar transistor 616 has an emitter serving as the input terminal 604, and another bipolar transistor 618 has a common base with the bipolar transistor 616 and an emitter serving as the input terminal 606. As shown in FIGS. 7-9, when the voltage on the phase node LX is $-Ith \times Ron$, where Ron is the on-resistance of the low-side switch 314, the zero-current detection signal ZCDET transits to high. Then, according to the characteristics of the bipolar transistor, it determines the zero-current threshold $$Ith = VT[\ln(1+1+2+\ldots m)]/Ron, \quad [\text{Eq-3}]$$

where VT is the thermal voltage and m is a power of 2. From the equation Eq-3, it is shown that the zero-current threshold Ith is determined by the collector current Ic of the bipolar transistor 616. The N-bit counter 600 controls switches 608 to 614 according to the signals Reduce and Latch from the body-diode turn-on time controller 310 to determine the collector current Ic and thereby adjust the zero-current threshold Ith.

Figure 12:
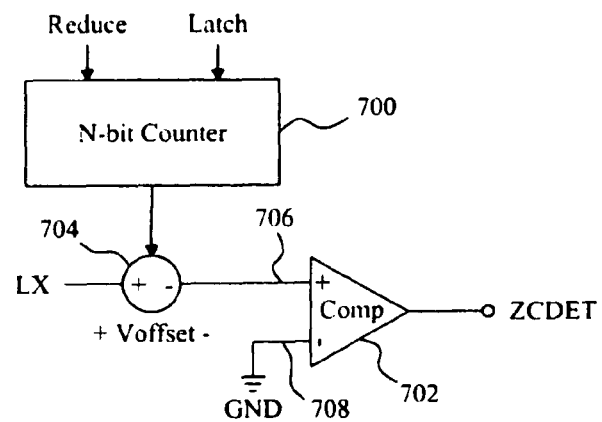
FIG. 12 is a second embodiment for the zero-current sense circuit in FIG. 7.

FIG. 12 provides a second embodiment for the zero-current sense circuit 308 of FIG. 7, in which an N-bit counter 700 controls a voltage source 704 to provide an offset voltage Voffset according to the signals Reduce and Latch, and a comparator 702 has an input terminal 706 connected to the phase node LX with the voltage source 704 therebetween, and another input terminal 708 grounded. When the voltage on the phase node LX rises up such that the inputs 706 and 708 of the comparator 702 are equal, the zero-current detection signal ZCDET is triggered and transits to high. In further detail, when the voltage on the phase node LX is $-Ith \times Ron$, the zero-current detection signal ZCDET transits to high to turn off the low-side switch 314, and the body diode 316 is turned on to remain the inductor current IL flowing in the current direction. The zero-current detection signal ZCDET will not transit back to low unless the voltage on the phase node LX becomes greater than zero. The N-bit counter 700 remains or adjusts the zero-current threshold Ith by controlling the voltage source 704, and the body-diode turn-on time controller 310 determines the signals Reduce and Latch according to the turn-on time of the body diode 316 for the N-bit counter 700, so as to control the offset voltage Voffset and thereby remain or adjust the zero-current threshold Ith. Alternatively, the voltage source 704 may be connected between the input terminal 708 of the comparator 702 and the ground terminal GND with inverse polarity, to adjust the zero-current threshold Ith.

Figure 13:
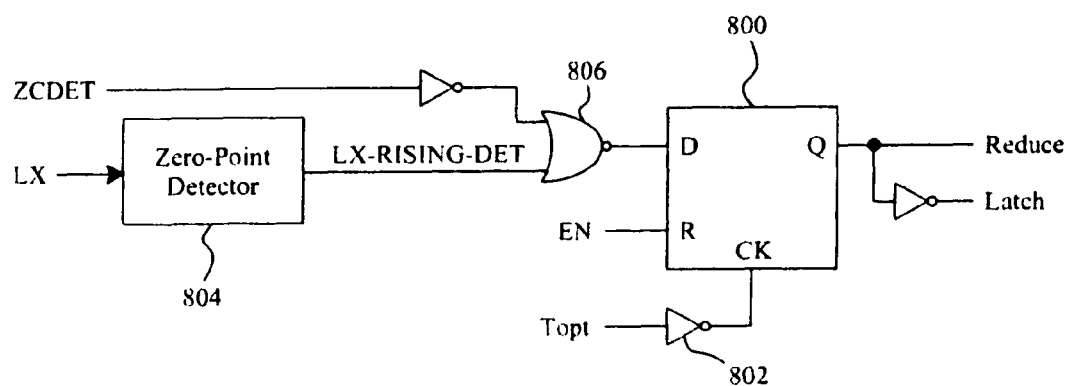
FIG. 13 is an embodiment for the body-diode turn-on time controller in FIG. 7.

FIG. 13 is an embodiment for the body-diode turn-on time controller 310 of FIG. 7. The zero-current detection signal ZCDET is connected to an input terminal of a NOR gate 806 through an inverter, a zero-point detector 804 monitors the voltage on the phase node LX to determine a signal LX-RISING-DET to send into another input terminal of the NOR gate 806, and the output of the NOR gate 806 is used as the input D of a flip-flop 800. The optimal body-diode turn-on time Topt is preset and connected to the clock input terminal CK of the flip-flop 800 through an inverter 802, and an enable signal EN is connected to the reset input terminal R of the flip-flop 800 to turn on or off the flip-flop 800. Referring to FIGS. 9 and 13, when the inductor current IL falls down to the threshold Ith at time t2, the zero-current detection signal ZCDET transits to high, the body diode 316 is turned on, and the voltage on the phase node LX becomes lower than zero. At this time, the output LX-RISING-DET of the zero-point detector 804 is still low as shown by the waveform 506, and the NOR gate 806 triggers a high-level signal D to the flip-flop 800. Until the voltage on the phase node LX rises up to zero at time t3, the body diode 316 is turned off, and the signal LX-RISING-DET transits to high, such that the signal D transits to low. If the time duration that the signal D stays at high level is longer than the optimal body-diode turn-on time Topt, the output Reduce of the D flip-flop 800 will be high and reduce the zero-current threshold Ith of the zero-current sense circuit 308, for example by the N-bit counter 600 or 700. On the contrary, if the time duration that the signal D stays at high level is shorter than or equal to the optimal body-diode turn-on time Topt, the signal Latch will be high and remain the current zero-current threshold Ith of the zero-current sense circuit 308.

As illustrated by the above embodiments, the proposed apparatus and method can prevent reverse inductor current from the output terminal of a switching regulator, and also control the body-diode turn-on time of the low-side switch within a given value. More particularly, the proposed apparatus and method have self-calibration mechanism to adjust the zero-current threshold, and can control the zero-current threshold to self-adjustable level, which is dependent on the application circuit for any inductor size and input/output voltages. Furthermore, the proposed apparatus and method can reduce the body-diode turn-on time to an optimal interval, and thereby improve the light-load efficiency.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An adaptive zero-current sense method for a switching regulator including a low-side switch connected to a phase node and switched to control an inductor current, the low-side switch having a body diode, the method comprising the steps of:

A. monitoring the inductor current during the low-side switch is on;
   B. triggering a first signal to turn off the low-side switch if the inductor current falls down to a zero-current threshold during the low-side switch is on;
   C. monitoring a turn-on time of the body diode after the low-side switch is turned off in response to the first signal;
   D. determining a second signal to adjust the zero-current threshold according to the turn-on time of the body diode; and
   E. adjusting the zero-current threshold if the turn-on time of the body diode is shorter than a given value.

2. The adaptive zero-current sense method of claim 1, wherein the step A comprises the step of comparing a voltage on the phase node with a reference voltage by a comparator.

3. The adaptive zero-current sense method of claim 2, further comprising the step of turning off the first signal when the voltage on the phase node rises up across the reference voltage.

4. The adaptive zero-current sense method of claim 2, wherein the step C comprises the step of determining the turn-on time of the body diode by using the first signal and the voltage on the phase node.

5. The adaptive zero-current sense method of claim 2, wherein the step E comprises the steps of providing an offset voltage to the input of the comparator which receives the voltage on the phase node or the reference voltage.

* * * * *